(12) United States Patent
Lorthioir et al.

(10) Patent No.: US 7,481,330 B2
(45) Date of Patent: Jan. 27, 2009

(54) REMOVABLE GRIP HANDLE DEVICE ADAPTABLE TO CONTAINERS OF DIFFERENT THICKNESS

(75) Inventors: Christophe Lorthioir, Poirier Martin (FR); Michel Montgelard, Cran Gevrier (FR)

(73) Assignee: SEB SA, Ecully (FR)

( * ) Notice: Subject to any disclaimer, the term of this patent is extended or adjusted under 35 U.S.C. 154(b) by 449 days.

(21) Appl. No.: 10/521,475

(22) PCT Filed: Jul. 16, 2003

(86) PCT No.: PCT/FR03/02250

§ 371 (c)(1),
(2), (4) Date: Jul. 5, 2005

(87) PCT Pub. No.: WO2004/010832

PCT Pub. Date: Feb. 5, 2004

(65) Prior Publication Data

US 2006/0006186 A1    Jan. 12, 2006

(30) Foreign Application Priority Data

Jul. 24, 2002    (FR) .................................... 02 09384

(51) Int. Cl.
*B65D 25/28* (2006.01)
*A47J 45/07* (2006.01)
*A47J 45/10* (2006.01)

(52) U.S. Cl. .................. 220/759; 294/31.1; 294/28; 294/27.1; 220/762; 220/763

(58) Field of Classification Search ............... 220/759, 220/762–764; 294/27.1–34
See application file for complete search history.

(56) References Cited

U.S. PATENT DOCUMENTS

| | | | | | |
|---|---|---|---|---|---|
| 1,406,826 | A | * | 2/1922 | Dugger | 220/759 |
| 2,712,151 | A | * | 7/1955 | Adolph | 220/759 |
| 3,065,016 | A | * | 11/1962 | Serio | 294/31.1 |
| 3,065,017 | A | * | 11/1962 | Serio | 294/31.1 |
| 3,065,018 | A | * | 11/1962 | Serio | 294/31.1 |
| 3,108,316 | A | * | 10/1963 | Peale | 220/759 |
| 3,157,909 | A | * | 11/1964 | Schmitt | 220/759 |
| 3,186,026 | A | * | 6/1965 | Serio | 220/759 |
| 3,306,648 | A | * | 2/1967 | Serio | 294/27.1 |
| 3,438,082 | A | * | 4/1969 | Jones et al. | 220/759 |
| 3,474,486 | A | * | 10/1969 | Serio et al. | 220/759 |
| 4,512,495 | A | * | 4/1985 | Bauer et al. | 220/316 |
| 4,577,367 | A | * | 3/1986 | Durand | 220/759 |
| 5,704,092 | A | * | 1/1998 | Nicollet et al. | 16/425 |
| 6,000,100 | A | * | 12/1999 | Montgelard | 16/425 |

(Continued)

FOREIGN PATENT DOCUMENTS

FR        2 739 772        4/1997

(Continued)

*Primary Examiner*—Anthony D Stashick
*Assistant Examiner*—Ned A Walker
(74) *Attorney, Agent, or Firm*—Bachman & LaPointe, P.C.

(57) ABSTRACT

A removable grip device for container has two members forming a gripper mounted on a gripper body, one of which is mobile in translation along a longitudinal direction between an open position and a closed position, displacement elements adapted to move the mobile member. The device has locking elements adapted to prevent the mobile member from being spaced apart in closed position.

15 Claims, 2 Drawing Sheets

U.S. PATENT DOCUMENTS

| | | | |
|---|---|---|---|
| 6,257,439 B1 * | 7/2001 | Hsu | 220/759 |
| 6,318,776 B1 * | 11/2001 | Lee | 294/34 |
| 6,393,973 B1 * | 5/2002 | Velo et al. | 99/422 |
| 6,439,420 B1 * | 8/2002 | Park | 220/759 |
| 6,708,373 B2 * | 3/2004 | Dodane | 16/425 |

FOREIGN PATENT DOCUMENTS

| | | |
|---|---|---|
| FR | 2 768 914 | 4/1999 |
| JP | 2001224514 | 8/2001 |
| JP | 2002034804 | 2/2002 |

* cited by examiner

REMOVABLE GRIP HANDLE DEVICE ADAPTABLE TO CONTAINERS OF DIFFERENT THICKNESS

BACKGROUND OF THE INVENTION

This invention relates to a removable gripping device for a container, particularly a removable handle for a pot or a pan, adaptable to different container thicknesses.

A removable gripping device for a container of the type comprising two members forming a gripper mounted on a gripping body is known, in which one of the members forming the gripper is free to move in translation with respect to the gripping body, along a direction approximately parallel to the longitudinal direction of the gripping body between an open position and a closed position in which the members forming a gripper are adapted to grip an edge of the container, the removable gripping device comprising displacement means adapted to displacing members forming the gripper with respect to each other, said displacement means comprising a lever free to move in rotation with respect to the gripping body between an extended position and a retracted position in which the mobile member forming a gripper is in the closed position, and a transmission means extending between the lever and the mobile member forming a gripper adapted to displacing the mobile member forming a gripper in translation when the lever is pivoted, said displacements means being adapted to adjusting the distance separating the two members forming a gripper to the thickness of the gripped container.

Such removable gripping devices are described in patent applications FR 2 739 772 and FR 2 768 914.

The removable gripping device described in document FR 2 739 772 comprises a locking means adapted to prevent separation of the mobile member forming a gripper when the mobile member forming a gripper is in the closed position. Since this means is formed by two racks arranged on the lever and on the mobile member forming a gripper and adapted to engage in each other in order to maintain the mobile member forming a gripper in its position.

However, the efficiency of this locking means is limited for separation distances of members forming a gripper in a closed position for which the two racks are perfectly located with respect to each other so as to enable perfect cooperation by engagement, in other words when the vertices of a first rack are exactly in position in the bottoms of the other rack. Furthermore, the racks system cannot give an efficient locking means when the container carries a high load.

Thus, removable gripping devices according to prior art enable adjustment of the distance separating the two members forming a gripper in the closed position to the thickness of the gripped container, but cannot prevent a large load in the gripped container from setting up a lever effect on the two members forming a gripper, and consequently separating them from each other (up to the distance corresponding to the maximum thickness of containers that can be gripped) thus causing separation of the container from the gripping device (particularly if the container has a thin edge), which means that there is a risk that the contents of the container that the user is lifting could spill on himself or herself, and consequently a risk of scalding if the container was on a hot plate.

One problem that arises is to make a removable gripping device in which when the members forming the gripper in the closed position cannot be moved towards a closed position designed to grip a container with a thicker edge, even if the displacement means are adapted so that the distance separating the members forming a gripper when in the closed position can be adjusted to suit the thickness of the gripped edge.

SUMMARY OF THE INVENTION

The solution proposed to this problem is a removable gripping device of the type mentioned above, in which the locking means comprises a locking pin installed on the displacement means and designed to penetrate into a housing when the lever is in the retracted position.

Thus, although the gripping device is shaped such that the distance separating the two members forming a gripper in the closed position varies so as to be able to grip variable thickness container edges, and once the edge of the container has been gripped, the locking pin is positioned in an housing so that the two members forming a gripper are effectively locked in place.

According to one particular embodiment, the gripping device comprises a shaft about which the lever and transmission means are hinged, the shaft being located close to the end of the lever opposite the end at which the lever is connected to the gripping body, and being free to move in translation in a slit made in the transmission means close to the end of the transmission means opposite the end at which the transmission means is connected to the mobile member forming a gripper.

With this particular arrangement of displacement means, the gripping device can dependably grip the edges of the container with a thickness variable within a relatively large range of between 0.5 and 3.5 mm (corresponding approximately to the movement amplitude of the shaft in the slit).

According to another embodiment, the lever and the transmission means are short, so that the user always has space to hold the gripping body with his ring finger and his little finger, only the index and the middle finger being located at the lever, and so that it reduces the movement amplitude of the lever.

According to another particular arrangement, a coil spring housed in the transmission means is used as an elastic means of the toggle joint mechanism. Consequently, unlike gripping devices according to prior art comprising a leaf spring forming a connecting rod, there is no risk of damage when the edge of the gripped container is thick.

The small moving amplitude of the lever means that the lever and the transmission means may have vertical walls arranged such that even when the lever is in the extended position, the entire mechanism is concealed and protected from any dirt accumulation.

The presence of locking means according to this invention is particularly suitable for a device for which the elastic means of the toggle joint mechanism is a coil spring which is more elastic than the lever spring, but on the other hand is less resistant to the pressure applied by the container gripped by the members forming the gripper and which consequently, when acting alone, is less capable of preventing separation of these members forming a gripper.

Other special features of the invention will become clearer after reading the following detailed description.

BRIEF DESCRIPTION OF THE DRAWINGS

In the appended drawings given as a non-limitative example:

FIG. 4 is a sectional view of a locking pin according to this invention.

DETAILED DESCRIPTION OF THE PREFERRED EMBODIMENT(S)

Figure 1:
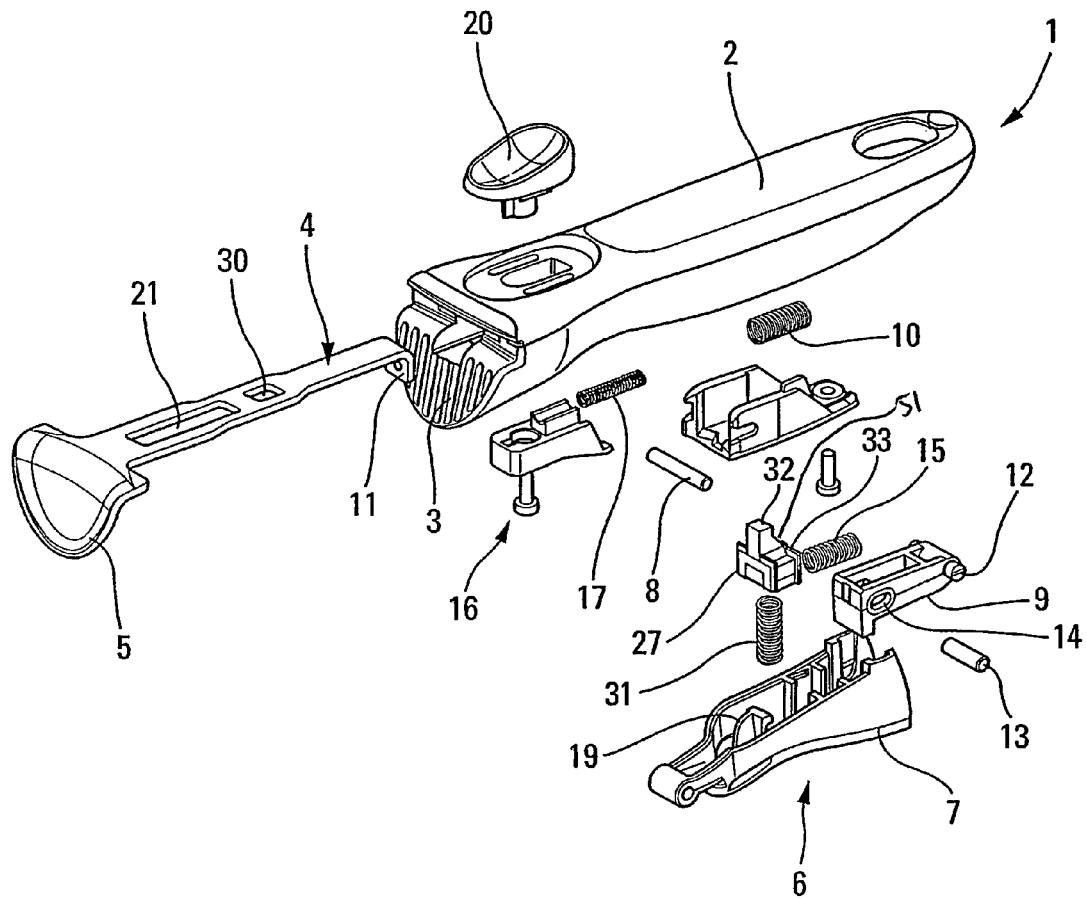
FIG. 1 is an exploded perspective view of a removable gripping device according to this invention.
Figure 1:
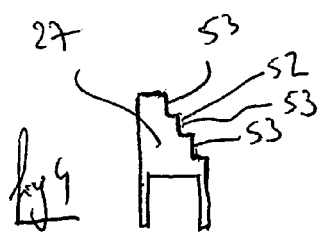

As can be seen in FIG. 1, a removable gripping device 1 for a container (for example a removable handle for a pot or pan) comprises a gripping body 2 on which two members forming a gripper 3, 4 are formed.

Figure 2:
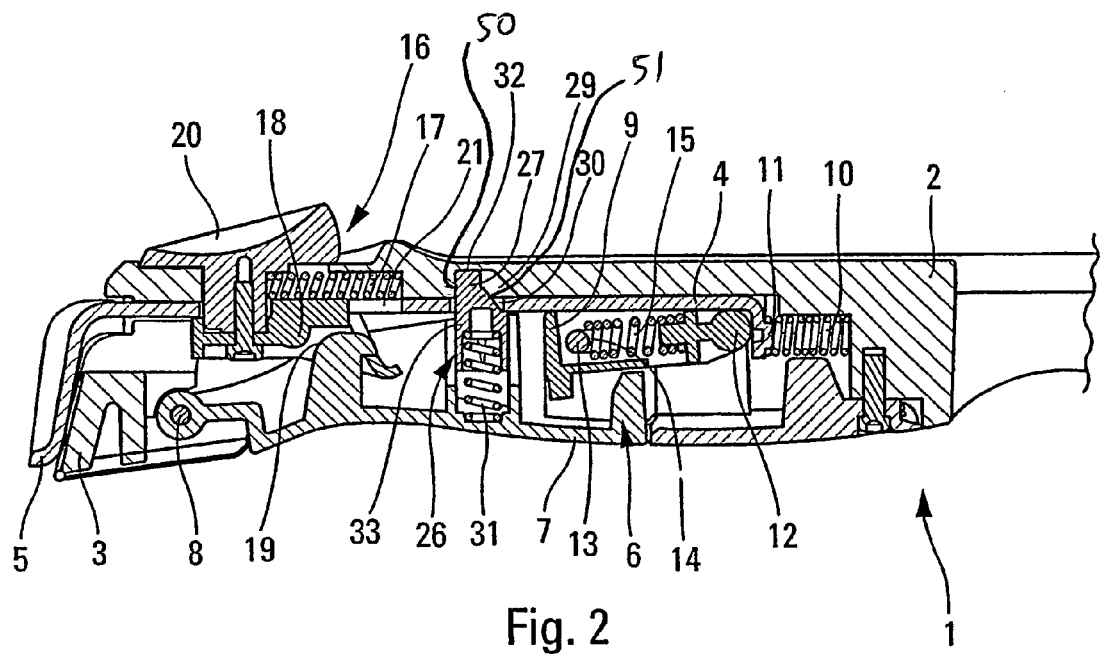
FIG. 2 shows a longitudinal sectional view of a removable gripping device, with the members forming the gripper in the closed position.

A first member forming a gripper 3 is fixed to one end of the gripping body 2, and the second member forming a gripper 4 is installed free to move in translation with respect to the gripping body 2, between an open position (FIG. 3) and a closed position (FIG. 2).

The mobile member forming a gripper 4 comprises a gripping end 5 which is adapted to cooperate with the fixed member forming a gripper 3, to grip an edge of the container when the mobile member forming a gripper 4 is in the closed position.

In this embodiment, the fixed member forming a gripper 3 and the gripping end 5 of the mobile member forming a gripper 4 are shaped so as to be able to grip containers for which the upper end of the edge is curved outwards and thus forms a short curved collar.

An opening spring 10 bears in contact with the gripping body 2 and a bearing end 11 of the mobile device forming a gripper 4 opposite the gripping end 5, and permanently tends to move the mobile member forming the gripper 4 towards its open position.

In this example, when the lever 7 is in its retracted position, it is completely within the gripping body 2 so that the user cannot manipulate it.

The removable gripping device 1 comprises displacement means 6 that are adapted to move the mobile device forming a gripper 4 with respect to the gripping body 2.

These displacement means 6 comprise a lever 7 installed free to move in rotation about a rotation axis 8 with respect to the gripping body 2 between an extended position (FIG. 3) and a retracted position (FIG. 2). The rotation axis 8 is normal to the longitudinal direction of the gripping body 2 and is located close to the fixed member forming the gripper 3 and close to a first end of the lever 7.

When the lever 7 is in the extended position, the mobile member forming a gripper 4 is in the open position, and when it is in the retracted position, the mobile member forming a gripper 4 is in the closed position.

The displacement means 6 also include a transmission means 9 that extends between the lever 7 and the mobile member forming a gripper 4 and that is adapted to moving the mobile member forming a gripper 4 in translation when the lever 7 is pivoted.

Figure 3:
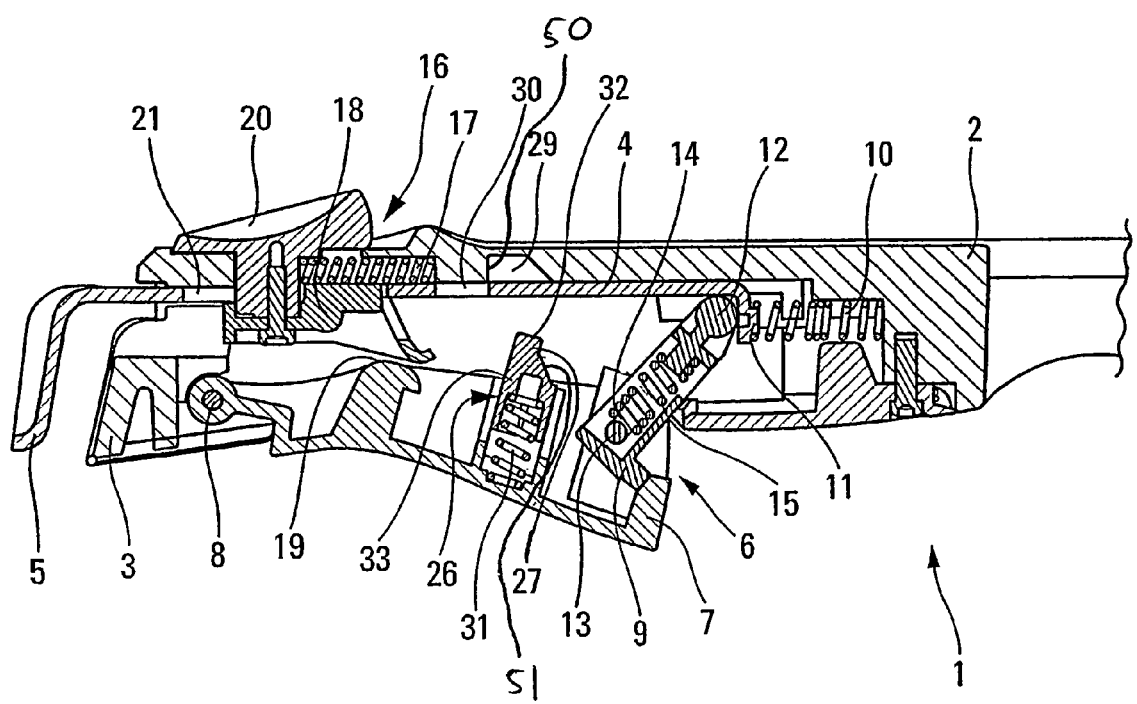
FIG. 3 is a longitudinal sectional view of a removable gripping device, the members forming the gripper being in the open position.

In the example illustrated in FIGS. 1 to 3, the transmission means 9 is a connecting rod 9 and the displacement means 6 are arranged as a toggle joint: the displacement means 6 are shaped such that the lever 7 is in a stable equilibrium position when it is in the extended position and when it is in the retracted position, and it passes through an unstable equilibrium position (defined by the equilibrium line of the displacement means 6) when it passes from one of these two stable equilibrium positions to the other.

Compared with the mobile member forming a gripper 4, the connecting rod 9 is free to rotate about a pivot axis 12 adjacent to the bearing end 11 of the mobile member forming a gripper 4 and adjacent to a first end of the connecting rod 9.

The connecting rod 9 is free to move in rotation with respect to the lever 7, about a shaft 13. The shaft 13 is free to move in translation in a slit 14 made in the connecting rod 9 and that extends in the longitudinal direction of the connecting rod, in order to maintain the relation as a toggle joint. The shaft 13 is free to move between an unstable equilibrium position in which the shaft 13 is located on the equilibrium line of the toggle joint mechanism defined by the rotation axis 8 and the pivot axis 12 and a stable equilibrium position in which the lever 7 is either in its extended position (the shaft 13 being on the so-called open side of the equilibrium line), or in its retracted position (the shaft 13 being located on the so-called closed side of the equilibrium line).

A toggle joint spring 15 permanently tends to move the shaft 13 towards its stable equilibrium position.

When the shaft 13 is located on the open side of the equilibrium line, the opening spring 10 firstly tends to move the mobile member forming a gripper 4 towards its open position, and secondly to move the lever 7 towards its extended position through the connecting rod 9.

When the shaft 13 is located on the closed side of the equilibrium line, the opening spring 10 tends to move the lever 7 towards its retracted position, and firstly forces the lever 7 into contact with the gripping body 2, and secondly forces the connecting rod 9 into contact with the mobile member forming a gripper 4, the toggle joint spring 15 being oriented along a direction very close to the direction of the opening spring 10. Consequently, the toggle joint spring 15 that tends to move the shaft 13 towards its equilibrium position, imposes a translation on the mobile member forming the gripper 4 towards its closed position, despite the presence of the opening spring 10.

When a user wants to grip the edge of a container, he or she positions the edge between the fixed member forming a gripper 3 and the gripping end 5 of the mobile member forming the gripper 4 in the open position, and makes the lever 7 pivot from its extended position into its retracted position. Rotation of the lever 7 causes rotation of the connecting rod 9 and translation of the mobile member forming a gripper 4, the shaft 13 then crossing the equilibrium line of the toggle joint mechanism, so as to obtain a stable grip of the edge of the container.

The free movement of the shaft 13 in the slit 14 enables adjustment of the distance between the gripping end 5 of the mobile member forming a gripper 4 in the closed position and the fixed member forming a gripper 3 at the thickness of the edge of the container.

The range of the distances separating the gripping end 5 of the mobile member forming a gripper 4 in the closed position and the fixed member forming a gripper 3 is significantly less than the movement amplitude of the shaft 13 in the slit 14 so that the shaft 13 can pass the equilibrium line to achieve a stable grip.

According to the embodiment illustrated in FIGS. 1 to 4, the shaft 13 is located close to the second end of the lever 7 opposite the first end close to the rotation axis 8. The slit 14 is made close to the second end of the connecting rod 9 opposite the first end close to the pivot axis 12, the shaft 13 being acted upon by the toggle joint spring 15 tending to move it towards the longitudinal end of the slit 14 that is closest to the second end of the connecting rod 9.

Due to this particular arrangement of displacement means 6, the griping device 1 can reliably grip the edges of the container, for which the thickness can vary within a relatively large range (between 0.5 and 3.5 mm).

Moreover, the use of a coil spring inside the connecting rod 9 acting as a toggle joint spring 15 eliminates any risk of the quick fastener mechanism being damaged, although the range of container edge thicknesses that can be gripped is large.

Furthermore, in order to facilitate gripping of the gripping device 1, even when the lever 7 is in the extended position, the length of the lever 7 is shorter such that a user holding the gripping device 1 will have his or her index finger and middle finger in contact with the lever 7, and the ring finger and little finger in contact with the gripping body. Consequently, the user can release the lever 7 from the gripping area consisting of the index finger and the middle finger, while keeping the ring finger and the little finger in position to hold the gripping body 2. Typically, the length of the lever corresponds to the width of three fingers in contact with each other (or about 7 cm from the rotation axis 8, or about 6 cm for the part of the lever pivoting outside the gripping body 2).

Furthermore, the use of a shorter connecting rod 9 can give a lever 7 with small movement amplitude, making it easier to hold the gripping device 1, even when the lever 7 is in the extended position.

Thus, the user does not need to change his or her grasp when the lever 7 is moved from the extended position to the retracted position, and vice versa.

Advantageously, the lever 7 and the connecting rod 9 include vertical walls arranged such that even when the lever 7 is in the extended position, the mechanism assembly is concealed and protected from any dirt accumulation.

According to the invention, the removable gripping device 1 comprises a locking means 26 adapted to prevent any separation of the mobile member forming a gripper 4 in the closed position.

In the example illustrated in FIGS. 1 to 3, the locking means 26 includes a locking pin 27 that is mounted on the lever 7 and that is adapted, when the lever 7 is in the retracted position, to penetrate into a housing with a through cross-section that depends on the position of the mobile member forming a gripper 4 in the closed position, and therefore depends on the thickness of the edge of the gripped container.

The housing comprises a cavity 29 formed in the gripping body 2, and a slot 30 formed through the mobile member forming a gripper 4. This slot 30 is located approximately facing the cavity 29 when the mobile member forming a gripper 4 is in the closed position.

Therefore, the through cross-section of the housing corresponds to the part of the through cross-section of the slot 30 facing the through cross-section of the cavity 29. Furthermore, as the thickness of the gripped container edge becomes thinner, the through cross-section of the housing increases when the mobile member forming a gripper 4 is in the closed position.

The locking pin 27 is installed free to move in translation with respect to lever 7, and a locking spring 31 continuously tends to move it towards the direction of the housing. The locking pin 27 tapers outwards from its head 32 towards its base 33 through which it is connected to the lever 7 through the locking spring 31.

When the user grips the edge of the container by moving the lever 7 towards its retracted position, the locking pin 27 connected to the lever 7 is pulled in the direction of the mobile member forming a gripper 4.

When the lever 7 is in the retracted position, the mobile member forming a gripper 4 is in the closed position adapted to the thickness of the edge of the gripped container. Under the action of the locking spring 31, the locking pin 27 penetrates partially into the housing, from the head 32 as far as the area of the locking pin 27 which has a section corresponding to the section of the housing: the locking pin 27 is forced in contact around the periphery of the through cross-section of the housing by the locking spring 31, thus preventing any sliding of the mobile member forming a gripper 4 in its closed position towards a housing with a larger through cross-section, in other words towards a closed position suitable for gripping a container with a thicker edge.

Furthermore, in order to prevent the locking pin 27 from tilting due to the pressure applied by the opening spring 10 on the mobile member forming a gripper 4, when the lever 7 is in the retracted position, the locking pin 27 bears in contact with the wall 50 that delimits the cavity 29 in the direction of the members forming a gripper 3, 4, regardless of the distance between the two members forming the gripper 3, 4. Thus, the locking pin 27 remains "straight" which reinforces the immobilisation of the mobile member forming a gripper 4.

In the embodiment illustrated in FIGS. 2 and 3, the locking pin 27 is flared as a result of a straight wall 51 between the head 32 and the base 33. Consequently, the through cross-section of the housing may be fixed, regardless of its size.

According to the embodiment illustrated in FIG. 4, the locking pin 27 is flared by a stepped wall 52 consisting of several steps 53 and connecting the head 32 to the base 33. According to this embodiment, the steps 53 are arranged perpendicular to the direction of translation of the mobile member forming a gripper 4, and consequently the locking pin 27 is only slightly damaged by this member.

This locking means 26 thus prevents any separation movement of the members forming a gripper in the closed position, particularly that can occur due to a lever effect caused by the weight of the loaded container (particularly if the container has a thin edge).

Furthermore, the removable griping device 1 comprises actuation means 16 installed free to move in translation on the gripping body 2 along a direction approximately parallel to the longitudinal direction of the gripping body 2.

The actuation means 16 are free to move between a rest position and an actuation position in which the actuation means 16 move the lever 7 from its retracted position to its extended position.

The actuation means 16 are continuously forced towards their rest position by a return spring 17 bearing in contact with the gripping body 2 and the actuation means 16.

As can be seen in FIGS. 1 and 2, the lever 7 comprises a bearing surface 19, and the actuation means 16 comprise an element forming an inclined plane 18 adapted to stop in contact with the bearing surface 19 when the lever 7 is in the retracted position, and the actuation means 16 are in the actuation position.

Furthermore, the actuation means 16 comprise an actuation button 20 that projects on the surface of the removable gripping device 1 opposite the surface on which the lever 7 is fixed, and that is adapted to be manoeuvred by the user.

The mobile member forming a gripper 4 has a groove 21 through which the activation button 20 is fixed to the inclined plane 18 (the activation button 20 and the inclined plane 18 are located on each side of the mobile member forming a gripper 4) such that the movement of the mobile device forming a gripper 4 are not hindered by the actuation means 16, and vice versa.

When the user wants to move the lever 7 from its retracted position to its extended position so as to release the container from the members forming the gripper 3, 4, he or she moves the actuation means 16 in translation as far as the actuation position, using the activation button 20. The activation button 20 enables the user to manoeuvre the activation means 16 without needing to change grasp, simply using the thumb.

Obviously, this invention is not limited to the embodiment described in detail above.

For example, it would be possible to make a removable gripping device in which the transmission means is not a connecting rod.

It would also be possible for the locking pin to be mounted on the connected rod (or any other transmission means) and not on the lever.

It would also be possible to have a removable gripping device, comprising two members forming a gripper mounted on a gripping body, one of the members forming a gripper free to move in translation with respect to the gripping body along a direction approximately parallel to the longitudinal direction of the gripping body, between an open position and a closed position in which the members forming the gripper are adapted to grip an edge of the container, the device also comprising displacement means adapted to displacing the members forming a gripper with respect to each other, said displacement means including a lever installed free to move in rotation with respect to the gripping body between an extended position and a retracted position in which the mobile member forming a gripper is in its closed position, and a transmission means extended between the lever and the mobile member forming a gripper and adapted to move the mobile member forming the gripper in translation when the lever is pivoted, characterised in that the lever is short (as described above, in other words such that the gripping body can be grasped behind the lever by at least the little finger and the ring finger), so that there is no need to change the grip depending on whether the lever is in its extended position or in its retracted position. Preferably, the transmission means (such as the connecting rod) are hinged at the end of the lever opposite the end at which it is hinged to the gripping body. Obviously, this type of gripping device could have any particular characteristics mentioned in this application.

The invention claimed is:

1. A removable gripping device for a container, comprising:
    two members forming a gripper mounted on a gripping body in which one of the members forming a gripper is mobile and free to move in translation with respect to the gripping along a direction approximately parallel to a longitudinal direction of the gripping body between an open position and a closed position in which the members forming the gripper are adapted to grip an edge of the container, said gripping body having an internal cavity with a wall,
    displacement means for displacing the members forming the gripper with respect to each other, said displacement means comprising a lever free to move in rotation with respect to the gripping body between an extended position and a retracted position in which the mobile member forming the gripper is in the closed position, and a transmission means extending between the lever and the mobile member forming the gripper adapted to displacing the mobile member forming the gripper in translation when the lever is pivoted, said displacement means being adapted to adjust a distance separating the two members forming the gripper in the closed position to a thickness of the gripped container when the lever is in the retracted position, and
    a locking pin installed on the displacement means, said locking pin having a head defining its uppermost portion and a base defining its lowermost portion, a first spring disposed underneath the base, and when said lever is in said retracted position and the two members forming the gripper are in the closed position adjusted to the thickness of the gripped container, said locking pin is positioned within said cavity so that said head is brought in contact with said wall by the mobile member forming a gripper that is urged by a second spring.

2. A removable gripping device according to claim 1, wherein the wall of the cavity on which the locking pin bears in contact delimits the cavity in the direction of the members forming the gripper.

3. A removable gripping device according to claim 1, wherein the displacement means are shaped such that the lever is in a stable equilibrium position when in the extended position and when in the retracted position, and the lever passes through an intermediate unstable equilibrium position when pivoting from one of the two stable equilibrium positions to the other.

4. A removable gripping device according to claim 1, wherein the second spring is housed in the transmission means and adapted to apply a force to the mobile member so as to adjust a distance separating the two members forming the gripper.

5. A removable gripping device according to claim 1, wherein the housing has a through cross-section that depends on the position of the mobile member forming the gripper in the closed position.

6. A removable gripping device according to claim 5, wherein the through cross-section of the housing becomes larger when the two members forming the gripper become closer to each other when in the closed position.

7. A removable gripping device according to claim 1, wherein, when the lever is in the retracted position, the locking pin penetrates into a housing that comprises the cavity formed in the gripping body and a slot formed through the mobile member forming the gripper.

8. A removable gripping device according to claim 7, wherein the wall of the cavity on which the locking pin bears in contact delimits the cavity in the direction of the members forming the gripper, the locking pin pressed by a wall delimiting the slot in the direction opposite the direction of the members forming the gripper.

9. A removable gripping device according to claim 1, wherein the locking pin is installed on the lever.

10. A removable gripping device according to claim 9, wherein the locking pin is installed free to move in translation with respect to the lever and a locking spring continuously tends to move the locking pin towards the direction of the housing.

11. A removable gripping device according to claim 1, wherein the locking pin is flared from the head as far as the base through which the locking pin is connected to the displacement means.

12. A removable gripping device according to claim 11, wherein the locking pin is flared by a straight wall connecting the head to the base.

13. A removable gripping device according to claim 11, wherein the locking pin is flared by a stepped wall consisting of several steps and connecting the head to the base.

14. A removable gripping device according to claim 1, wherein the transmission means are formed from a connecting rod free to move in rotation with respect to the lever and to the mobile member forming the gripper.

15. A removable gripping device according to claim 14, wherein the connecting rod is mounted free to rotate on the lever about a shaft close to an end of the lever opposite an end through which the lever is connected to the gripping body.

* * * * *